G. H. HOLM.
MEANS FOR PROTECTING COUNTERSUNK SCREW HEADS.
APPLICATION FILED FEB. 12, 1912.
1,105,658.
Patented Aug. 4, 1914.
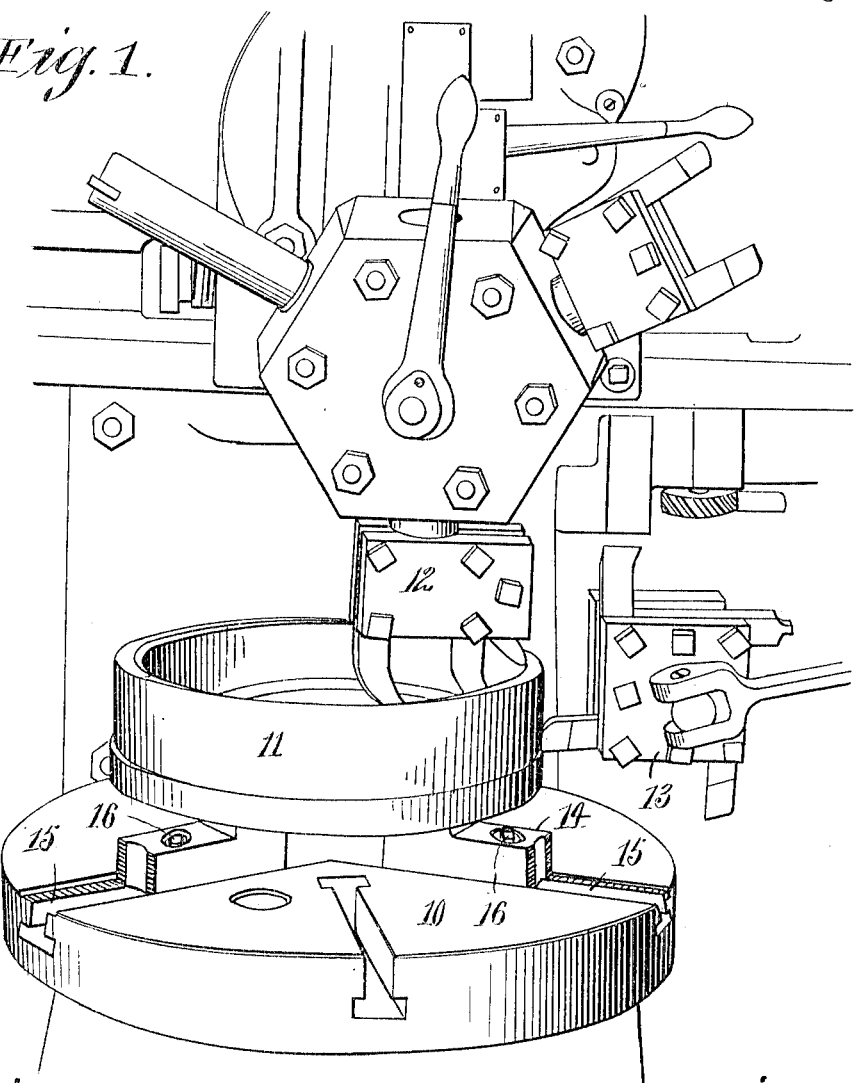
Fig. 1.
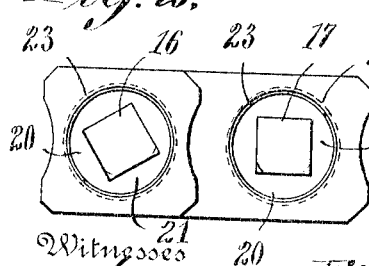
Fig. 2.
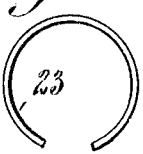
Fig. 4.
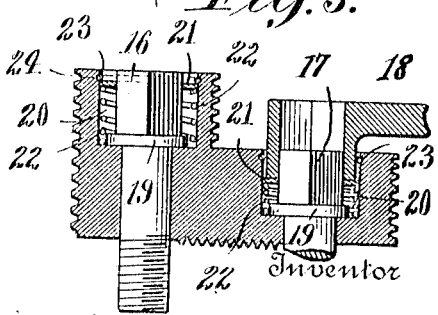
Fig. 3.
Fig. 5.
Witnesses
Inventor
Gustave H. Holm
By Chamberlain & Newman Attorneys

UNITED STATES PATENT OFFICE.

GUSTAVE H. HOLM, OF BRIDGEPORT, CONNECTICUT.

MEANS FOR PROTECTING COUNTERSUNK SCREW-HEADS.

1,105,658.   Specification of Letters Patent.   Patented Aug. 4, 1914.

Application filed February 12, 1912. Serial No. 677,106.

*To all whom it may concern:*

Be it known that I, GUSTAVE H. HOLM, citizen of the United States, and resident of Bridgeport, in the county of Fairfield and State of Connecticut, have invented certain new and useful Improvements in Means for Protecting Countersunk Screw-Heads, of which the following is a specification.

This invention relates to means for protecting countersunk holes for screw heads, to prevent the same from becoming filled with dirt, as for instance those used in clamping jaws for securing work upon a rotary table of machine tools.

Heretofore considerable trouble and inconvenience has been experienced in the adjustment of screws as used for securing the clamping jaws upon tables of machine tools, when it became necessary to adjust such jaws, for the reason that the holes surrounding the head of the screws would be filled with chips and dirt, and would first have to be picked out before a wrench could be placed upon the screw for releasing the same.

It is therefore, the purpose of my invention to provide a covering means whereby the space or hole surrounding the heads of screws will be protected against foreign matters such as the chips and dust from the operation of a machine, or for other reasons, and to so design and construct said means, that the said screw head will at all times be free and ready for the attachment of an operating wrench for the tightening or loosening of the screw.

With these and other objects in view the invention consists in the construction and novel combination of parts hereinafter fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings, and upon which, Figure 1, shows a front perspective view of a part of a machine tool, including the frame, tool heads, rotary table, and clamping jaws to the countersunk screw holes of which my invention is shown applied. Fig. 2, is a top plan view of one of said clamping jaws with screw and protecting means attached. Fig. 3, is a central vertical longitudinal section through the said jaw and covering means and illustrating the application of a wrench to one of the screws thereof. Fig. 4, is a detached plan view of an open spring ring forming a shoulder for my protecting device, and, Fig. 5, is a top plan view of a cap or washer which constitutes the inclosing member for a screw head socket as will later be described.

Referring in detail to the characters of reference marked upon the drawing 10 represents a rotary work carrying table forming a part of a machine tool. 11 a cylindrical body carried thereon and constituting the work that is being operated upon by the tools mounted in the tool heads 12 and 13. In machines of this class the work to be operated upon is usually of a cylindrical character and is secured to the table by means of the clamping jaws 14 adjustably mounted in the radial slots 15 of the table. Each of these jaws is secured to the table by means of a pair of clamping screws 16 and 17 that freely pass through the end portions of the jaws and the said slots and engage a slidable nut adjustably mounted in the T of the slot and adapted to be moved in or out by the movement of the jaw when the screws are loose. These jaws may be arranged to engage either the inside or outside of a cylindrical body in a manner to secure the same in position to be operated upon by the tools of the heads referred to.

The two screws in each jaw are substantially alike in construction, but by reason of the particular form and relative thickness of the two end portions of the jaw, one of the screws is necessarily made longer than the other, but is designed to be operated in the same manner, by means of a suitable attachable wrench 18 which is set down into the socket for the screw head in order to engage and turn the latter. The head of the screw as shown is square and includes an annular shoulder 19 that is seated in the bottom of the hole or socket 20 in order to afford a suitable grip upon the jaw. My improved means for protecting these screw head sockets includes a round cap 21 shown in detail in Fig. 5 having a square hole therein which is of a proper size and shape to receive the head of the screw while the outer circumference and shape of the cap is made to freely fit the diameter of the socket so as to insure a free vertical movement of the cap along the head of the screw and within its socket. A small spiral spring 22 is seated in the socket of the jaw around the head of the screw between the bottom of the socket and the said cap, the tendency of said spring being to normally hold the cap in an upper position as shown in Fig. 3 in connection with the longer screw. I provide a shoulder against which this cap is normally seated as shown in the drawings, in the form of an expandable open wire spring 23 that is set into an internal annular groove 24 formed adjacent to the outer edge of the screw head socket. This device can be readily set in place as shown in Figs. 2 and 3 by first compressing the spring and can likewise be easily removed should it be necessary at any time to remove the screw or for any other reason to get at the inside of the socket. This cap is free to move up and down by the action of a wrench and the spring when it is necessary to operate the screw, and on the other hand would be normally set against the ring in a manner to positively prevent any dust or dirt from getting down in the socket. The little quantity of dirt or chips which might perhaps collect in the annular groove still existing with applicant's form for protecting means, would be very slight and could be readily brushed or blown out. It will, of course, be apparent that the construction of the head of the screw and the inclosures for the same as shown in the drawings are identical and therefore the same reference numerals are used to apply to both. For the purpose of illustration, however, in Fig. 3, we have shown a wrench applied to the shorter screw, to illustrate the inclosing cap shoved down and the spring beneath it compressed.

While my improved screw protecting means is shown and described as being applied to jaws for machine tools, yet it will be apparent that it can be used in other places to equal advantage, and therefore I do not wish to be limited in its use.

Having thus described my invention what I claim and desire to secure by Letters Patent is:—

1. The combination with a member having a countersunk screw-head hole and an annular shoulder formed around the inside of the outer edge of the hole, a screw mounted in the hole, a movable cap for inclosing the outer end of the hole and having an opening therethrough to surround the head of the screw, and a spring for normally holding the cap out against the said shoulder to close the hole around the screw.

2. The combination with a member having a countersunk screw head hole containing an annular groove formed around the inside of the outer edge of the hole, of a detachable spring ring to fit in said groove, a movable cap within the hole, and a spring for normally holding the cap out against the said shoulder.

3. The combination with a member having a countersunk hole, containing an annular groove formed around the inside of the outer edge of the hole, of a screw mounted in the hole, a detachable spring ring to fit in said groove, a movable cap for inclosing the space of the hole surrounding the head of the screw, and a spring for normally holding the cap out against the said ring, but adapted to permit the cap to be shoved in for the attachment of a wrench to the screw-head.

4. The combination with a member having a countersunk screw head hole with an annular groove formed around the inside thereof, of a screw having a head of a lesser diameter than the hole, a ring to fit in said groove, a cap movably mounted within the hole and having an opening to receive the said screw head therein, and a spiral spring within the hole and seated between the bottom thereof and the said cap for normally forcing the cap outward.

Signed at Bridgeport in the county of Fairfield and State of Connecticut this 3rd day of February A. D., 1912.

GUSTAVE H. HOLM.

Witnesses:
JOHN W. BRAY,
HARRY L. OVIATT.

---

Copies of this patent may be obtained for five cents each, by addressing the "Commissioner of Patents, Washington, D. C."